United States Patent [19]
Keck

[11] Patent Number: 5,677,584
[45] Date of Patent: Oct. 14, 1997

[54] BEARING ASSEMBLY FOR DYNAMOELECTRIC MACHINES

[75] Inventor: Arthur C. Keck, Fort Wayne, Ind.

[73] Assignee: General Electric Company, Fort Wayne, Ind.

[21] Appl. No.: 386,001

[22] Filed: Feb. 9, 1995

[51] Int. Cl.⁶ .................................................. H02K 5/16
[52] U.S. Cl. ........................ 310/90; 384/204; 384/412; 384/424
[58] Field of Search .................. 310/90; 384/203, 384/204, 209, 213, 214, 412, 420, 424

[56] References Cited

U.S. PATENT DOCUMENTS

| | | | |
|---|---|---|---|
| 1,978,484 | 10/1934 | Aufiero | 308/72 |
| 2,308,609 | 1/1943 | Koch | 308/72 |
| 2,448,500 | 8/1948 | Turner | 308/72 |
| 2,800,347 | 7/1957 | Wardwell, Jr. | 292/169 |
| 3,037,822 | 6/1962 | Plummer | 308/72 |
| 3,483,409 | 12/1969 | Phillips | 310/90 |
| 3,624,434 | 11/1971 | Dafler et al. | 310/90 |
| 3,714,705 | 2/1973 | Lewis | 29/596 |
| 3,728,563 | 4/1973 | Stone | 310/90 |
| 3,846,652 | 11/1974 | Lykes | 310/90 |
| 3,885,176 | 5/1975 | Cunningham | 310/90 X |
| 4,014,596 | 3/1977 | Kazama | 308/72 |
| 4,198,584 | 4/1980 | Otto | 310/90 |
| 4,350,912 | 9/1982 | Burton | 310/90 |
| 4,355,250 | 10/1982 | Langdon | 310/88 |
| 4,362,342 | 12/1982 | Bushor et al. | 308/36.1 |
| 4,409,714 | 10/1983 | Cunningham | 29/148.4 L |
| 4,494,027 | 1/1985 | Otto | 310/90 X |
| 4,634,298 | 1/1987 | Crawford | 384/209 |
| 4,726,112 | 2/1988 | King et al. | 29/596 |
| 4,800,309 | 1/1989 | Lakin | 310/90 |
| 4,806,025 | 2/1989 | Kamiyama et al. | 384/202 |
| 4,887,916 | 12/1989 | Adam et al. | 384/192 |
| 5,277,500 | 1/1994 | Keck | 384/204 |

Primary Examiner—Mark O. Budd
Attorney, Agent, or Firm—Ralph E. Krisher, Jr.

[57] ABSTRACT

A bearing assembly including a bearing member with a passageway therethrough at least in part defining a cylindrical journaling surface having a central axis and a preselected axial length is described. A partial circumferential or spherical surface on at least a part of a peripheral portion of the bearing member extends generally coaxial about the cylindrical journaling surface. A bearing seat supports the bearing member at a generally circular line of engagement defining an imaginary plane extending generally perpendicular to the central axis through the mid-point of the preselected axial length of the cylindrical journaling surface.

39 Claims, 6 Drawing Sheets

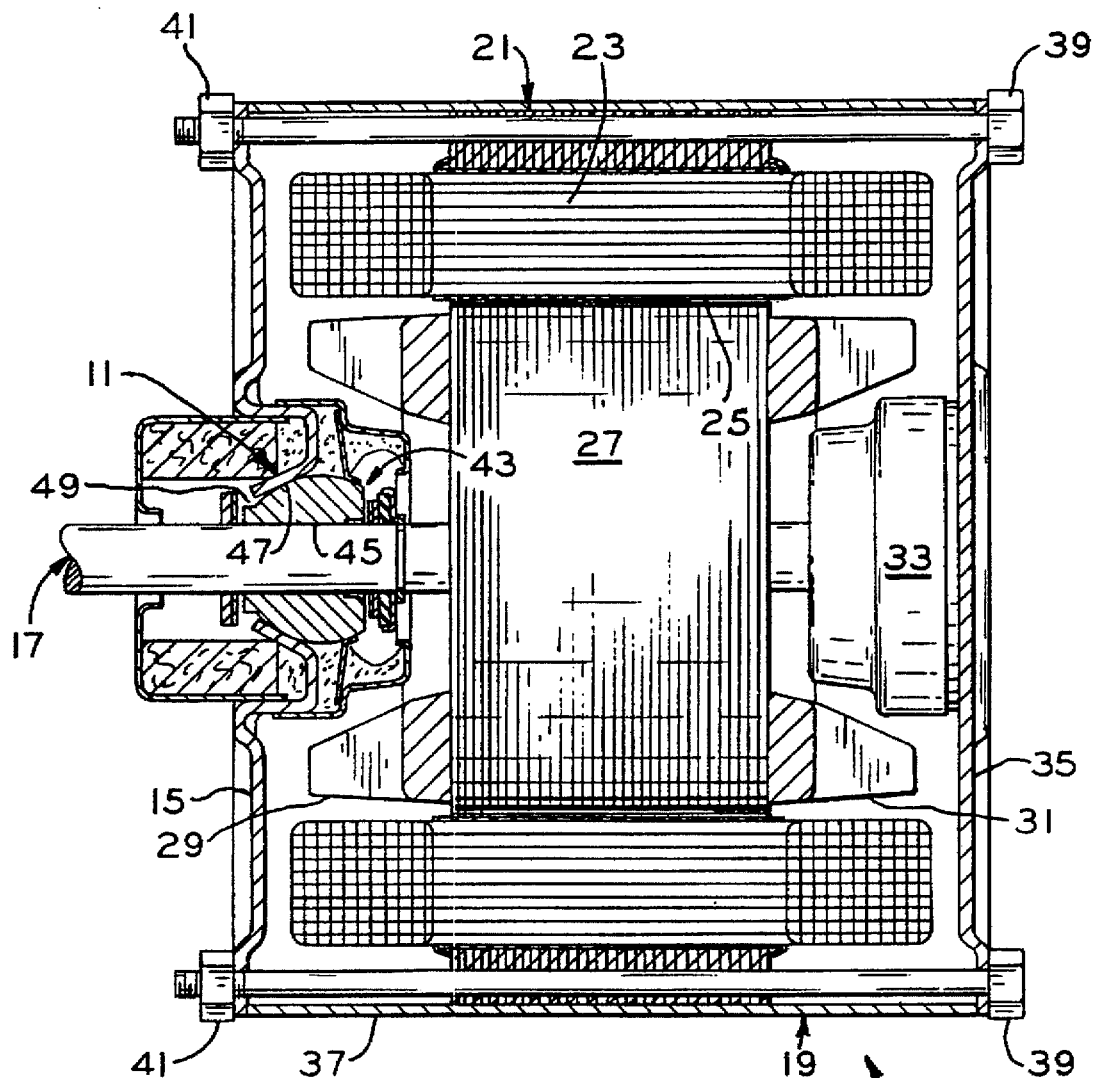
FIG_1

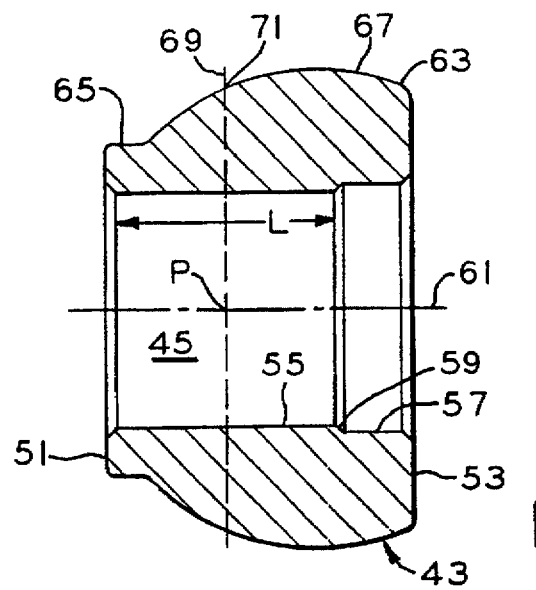
FIG_2
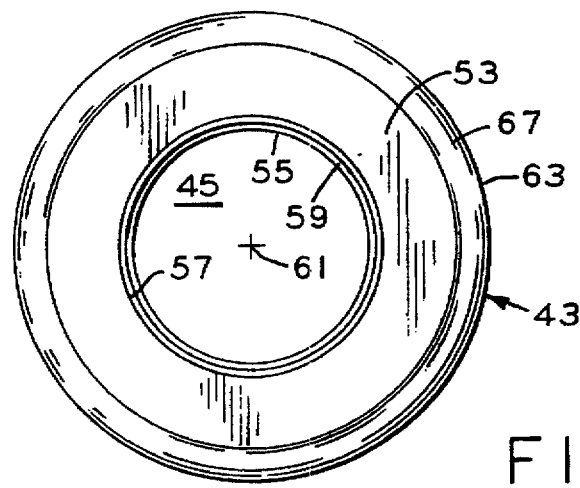
FIG_3
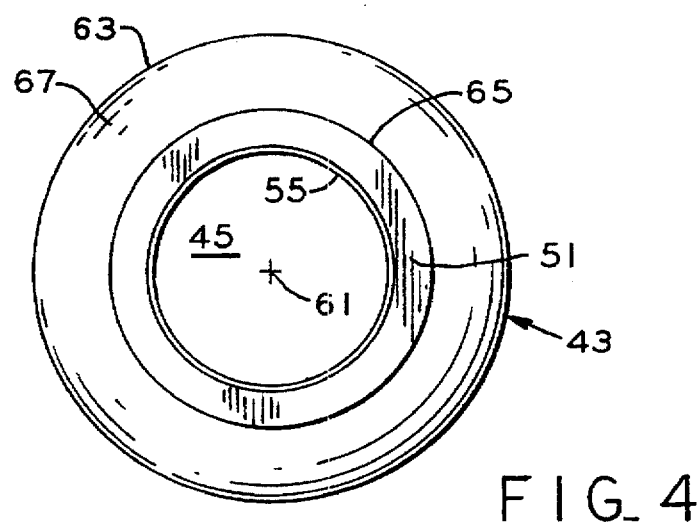
FIG_4

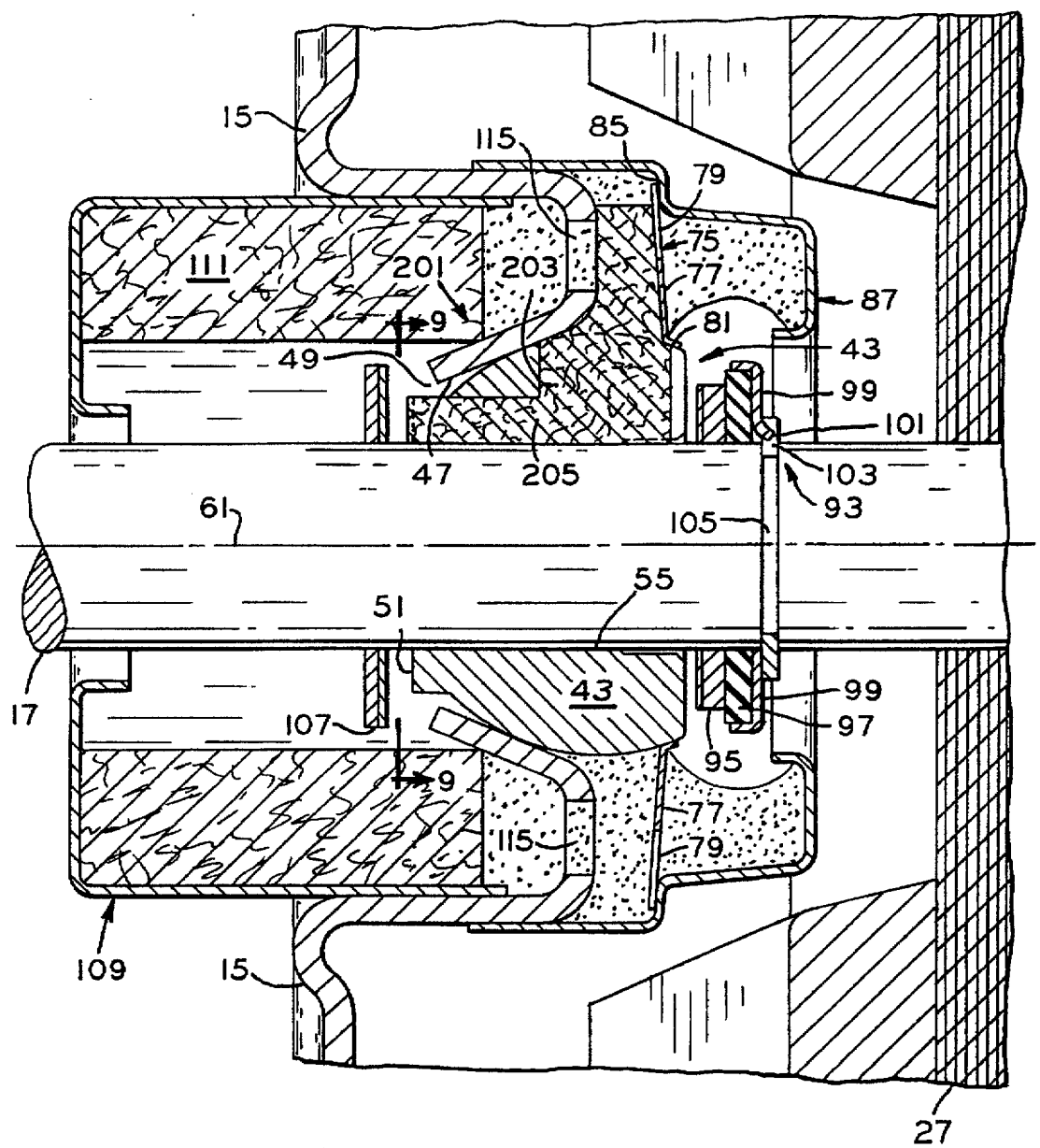
FIG_8

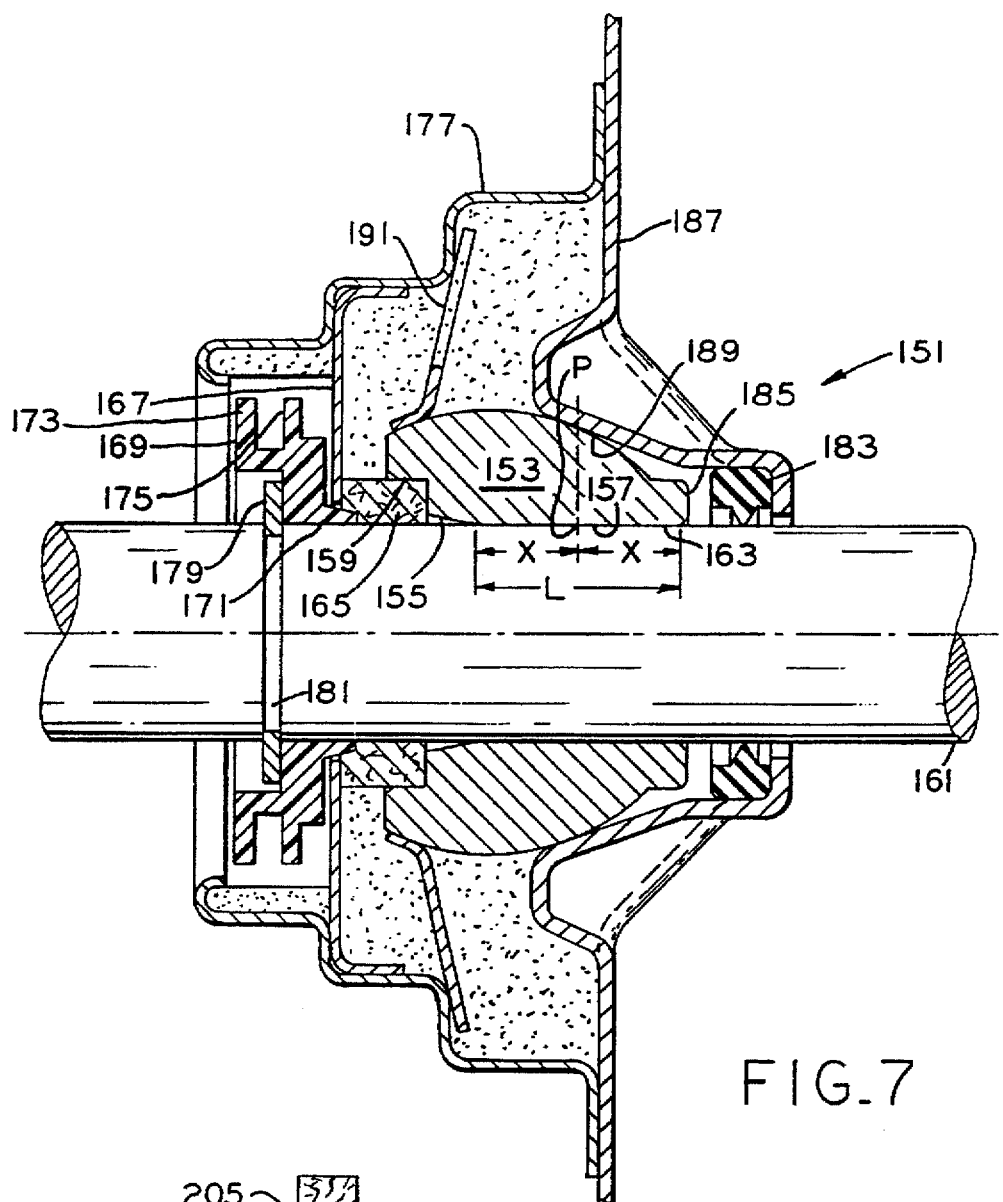
FIG_7
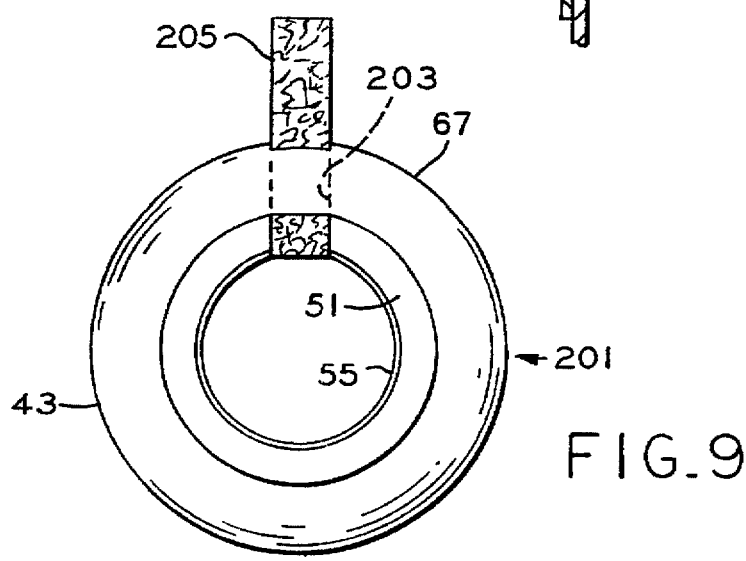
FIG_9

BEARING ASSEMBLY FOR DYNAMOELECTRIC MACHINES

FIELD OF THE INVENTION

This invention relates generally to a bearing assembly for use in dynamoelectric machines and, more particularly, to a bearing assembly for use in supporting a rotor shaft of a motor.

BACKGROUND OF INVENTION

Dynamoelectric machines such as motors typically include a rotatable rotor and a shaft extending outwardly from at least one end of the rotor. The shaft is mounted to the rotor so that the rotation axis of the shaft is coaxial with the axis of rotation of the rotor. The shaft extends from the rotor and through an opening formed in the motor end plate. Typically, a bearing is mounted in the end plate and supports the shaft.

Alignment between the shaft and the bearing is important because any misalignment could disturb operation oft he motor, including even possibly rendering the motor inoperable. For example, in normal operation, a hydrodynamic lubrication film is formed between the bearing and the shaft by oil supplied from an oil wick. If side forces or other forces cause misalignment between the bearing and the shaft, the film could be disrupted. As a result, metal-to-metal contact may be made between the bearing and the shaft. Such metal-to-metal contact, of course, is highly undesirable.

Various self-aligning bearing constructions are used to support rotor shafts, including constructions wherein a self aligning bearing having a partial spherical outer surface is located in spherical surface-to-surface seating contact with a bearing seat. A disadvantage of such known spherical surface-to-surface bearing constructions, however, is that the manufacturing tolerances for the spherical bearing surface and bearing seat must be small and thus can be difficult and expensive to achieve. For example, in one method of manufacture, the partial spherical surface on the alignable bearing is made predeterminedly dimensionally greater than that on the receiving surface and a wear-in operation is employed. More particularly, the partial spherical surface on the alignable bearing is oscillated with a preselected force against the mating spherical surface until desired engagement or fit is attained. This wear-in operation is time consuming and costly. Further, materials of low wear resistance are sometimes used to facilitate the wear-in operation, which materials can also lower the wear resistance of the finished assembly.

Other known bearing constructions include, for example, a bearing seat having a partial toroidal surface for seating in a generally circular line of engagement with a bearing surface. These known constructions, however, are complex to design and machine.

Accordingly, it is desirable and advantageous to provide a self-aligning bearing assembly which may be mounted in the motor end plate and which does not have close manufacturing tolerances. It also is desirable and advantageous to provide such a bearing assembly configured so as to minimize forces which normally tend to cause misalignment between the shaft and the bearing.

An object of the present invention is to provide an improved bearing construction which utilizes a generally circular line of seating engagement between a bearing member and a bearing seat but which does not require manufacturing the bearing member and bearing seat to close dimensional tolerances to achieve such seating engagement.

Another object of the present invention is to provide an improved bearing construction which distributes side forces and other forces acting to misalign the bearing and the rotor shaft so as to prevent disruption of the hydrodynamic lubricating film existing between the bearing and the shaft.

Yet another object of the present invention is to provide an improved bearing construction which better retains lubricating oil between the bearing and the rotor shaft.

Still yet another object of the present invention is to provide an improved self-aligning bearing assembly which is economical to manufacture and easily assembled.

SUMMARY OF THE INVENTION

These and other objects of the invention are attained by several forms of apparatus which, in one form, includes a bearing member having a passageway or bore therethrough adapted for receiving a rotor shaft. The passageway is at least in part defined by a generally cylindrical journaling surface having a preselected axial length. A partial circumferential or spherical surface on at least a part of an outer peripheral portion of the bearing member extends generally coaxially with the cylindrical journaling surface and engages a bearing seat along a first circular line of engagement.

In an aligned or coaxial attitude, the first circular engagement line lies on an imaginary plane extending generally perpendicularly to the axis of the cylindrical journaling surface and through the mid point of the preselected axial length of the journaling surface. Such engagement at the mid point of the journaling surface provides that side forces and other forces acting to misalign the bearing assembly produce equal moments on opposite axial sides of the mid point. Such forces, therefore, balance out and maintain the initial aligning attitude of the bearing member. The equal moments also act to distribute forces evenly along the journaling portion so as not to disrupt, during operation, the hydrodynamic oil film located between the journaling portion and the rotating shaft member positioned therein.

A bearing retainer is provided to transmit an aligning or self centering force to the bearing member for urging the beating member into a desired position with respect to the bearing seat. Particularly, the bearing retainer engages the partial circumferential or spherical outer surface of the bearing member along a second circular line of engagement radially equidistant from the axis of the bearing member with respect to the first circular line of engagement. Such engagement provides that the bearing member will effectively gimbal generally about the center of curvature of the bearing member outer surface when misaligning forces are present. This gimbaling action maintains the initial aligning attitude of the beating assembly.

The passageway through the bearing member includes a larger diameter "relieved" portion adjacent one end of the bearing member. A chamfer is provided between the cylindrical journaling portion and the relieved portion to facilitate insertion of a rotor shaft into the passageway during assembly. The chamfer also acts as a reservoir for supplying lubricating oil to the journaling portion. A counterbore or other cavity is provided adjacent the relieved portion in which a lubricating oil impregnable wicking member is located to further improve lubricating capabilities.

When placed in an operable condition with the rotor shaft inserted into the passageway of the bearing member, the bearing member aligns with the bearing seat and the bearing retainer as described above. Particularly, the bearing member engages the beating seat along the first circular line of engagement and the bearing retainer engages the bearing member along the second circular line of engagement. The bearing member, as described above, is self-aligning, load bearing and has enhanced lubricating capabilities. The beating assembly also eliminates costly and time consuming manufacturing steps required to produce closely toleranced fits and shapes.

BRIEF DESCRIPTION OF THE DRAWINGS

FIG. 1 is a sectional view illustrating a bearing assembly in association with an electric motor.

FIG. 2 is a sectional view of the bearing member of the assembly shown in FIG. 1.

FIG. 3 is a right side elevational view of the bearing member shown in FIG. 2.

FIG. 4 is a left side elevational view of the bearing member shown in FIG. 2.

FIG. 7 is an enlarged fragmentary sectional view of a bearing assembly in accordance with one form of the present invention and shown in association with a dynamoelectric machine also in fragmentary cross-section.

FIG. 8 is an enlarged fragmentary sectional view of a bearing assembly in accordance with another form of the present invention and shown in association with a dynamo-electric machine in fragmentary cross-section.

FIG. 9 is a left side elevational view of the alignable bearing member of the assembly shown in FIG. 8.

DETAILED DESCRIPTION OF THE DRAWINGS

Figure 5:
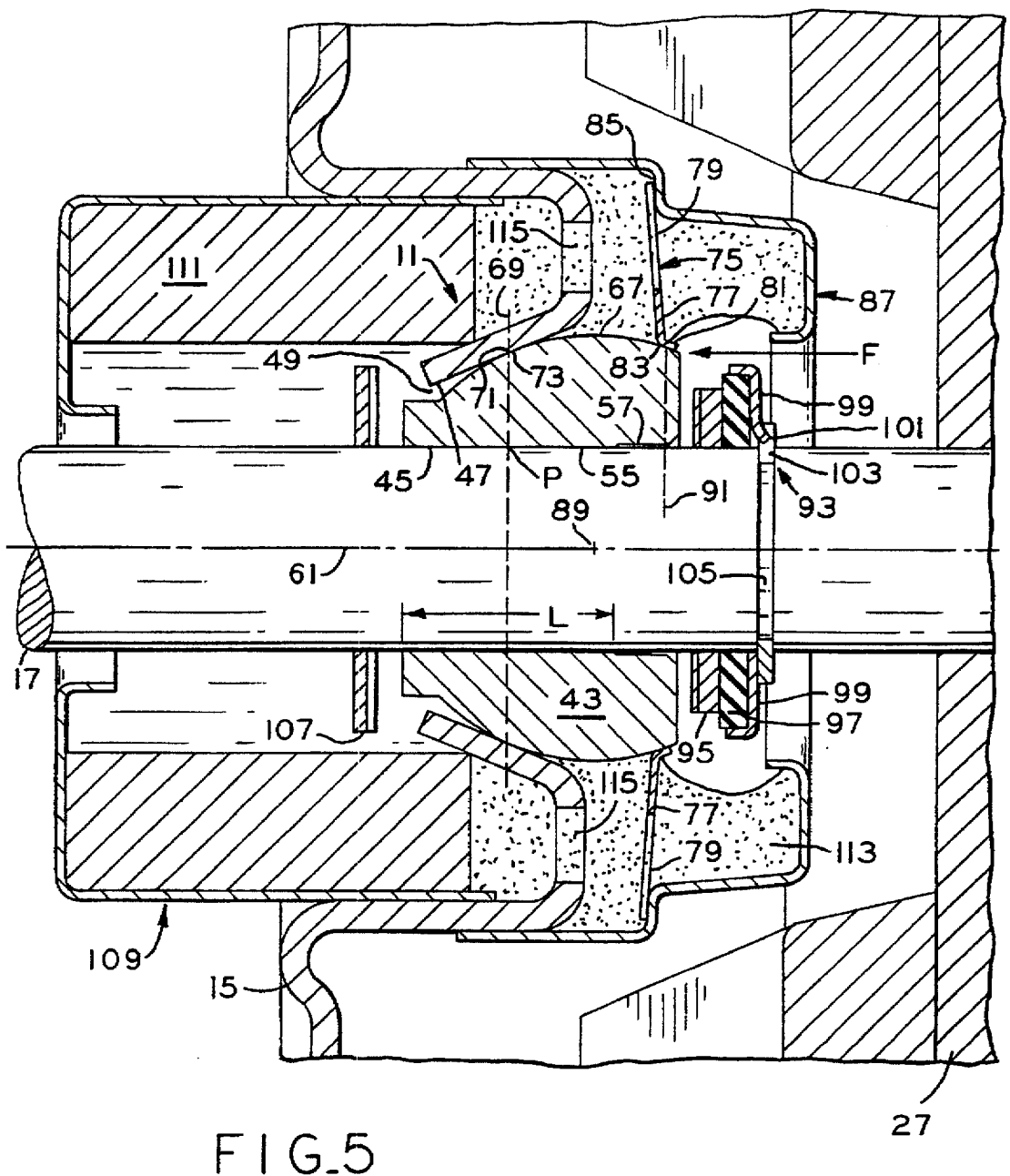
FIG. 5 is an enlarged fragmentary view of the bearing assembly illustrated in FIG. 1.

FIG. 1 shows a bearing assembly 11 in association with an electric motor 13. Bearing assembly 11 is mounted adjacent an end plate 15 of motor 13 for supporting and aligning one end of a shaft member 17 for rotation relative to a motor housing 19. Motor 13 includes a stator assembly 21 having annular windings 23 defining a central bore 25. A cylindrical shaped rotor 27 is located in bore 25 for rotation therein.

Shaft member 17 extends from an end 29 of rotor 27 and through bearing assembly 11. At an opposite end 31 of rotor 27, another alignable bearing assembly (not shown) is housed in a cover 33 adjacent an end plate 35 of housing 19. A cylindrical outer shell 37 extends between end plates 15 and 35, and a plurality of bolts 39 extend through end plates 15 and 35 and threadedly engage nuts 41.

Bearing assembly 11 includes a bearing member 43 having a passageway 45 therethrough for receiving shaft member 17. Bearing member 43 is seated in bearing engagement with a frusto-conical bearing seat 47 integrally formed with end plate 15 and defining a central opening 49.

FIG. 2 illustrates bearing member 43 in more detail. Bearing member 43 has an annular shape and is preferable constructed from sintered metal. Passageway 45 extends through beating member 43 between first and second oppositely facing end surfaces 51 and 53, respectively. Passageway 45 includes a smaller diameter cylindrical journaling portion 55 adjacent first end surface 51 and a larger diameter relieved portion 57 adjacent second end surface 53. Portions 55 and 57 are separated by a chamfer 59. Cylindrical journaling portion 55 has a central longitudinal axis 61. Relieved portion 57 preferably is coaxial about central axis 61. Importantly, journaling portion 55 has a preselected length indicated by the letter "L", and a preselected diameter adapted for cooperatively receiving shaft member 17. As hereinafter described, shaft member 17 rotates relative to bearing member 43 on a thin hydrodynamic film of lubricating oil formed between shaft member 17 and the bearing member walls forming journaling portion 55.

Bearing member 43 further includes a peripheral surface 63 having a cylindrical portion 65 adjacent first end surface 51 and a partial generally spherical portion 67. Partial spherical surface 67 is coaxial with cylindrical journaling portion 55 and is adapted for seating in bearing seat 47 and bearing retainer 75 (not shown in FIG. 2). Length L of cylindrical journaling portion 55 has an axial mid point indicated by the letter "P" located on axis 61, through which point P an imaginary plane, identified by a dotted line 69, passes perpendicular to axis 61. Imaginary plane P intersects spherical portion 67 at a point 71.

FIG. 3 is a right side view of bearing member 43 illustrating passageway 45 extending therethrough along with associated cylindrical journaling portion 55, relieved portion 57 and chamfer 59. FIG. 3 also shows partial spherical surface 67 of peripheral surface 63 adjacent end 53. FIG. 4 is a left side view of bearing member 43 showing passageway 45 extending therethrough, cylindrical journaling portion 55 and end surface 51, as well as cylindrical portion 65 adjacent end 51 and partial spherical surface portion 67.

FIG. 5 illustrates bearing member 43 installed in motor 13 with shaft member 17 extending through passageway 45 and partial spherical surface 67 engaged with bearing seat 47. Bearing member 43 is shown in an initial aligning position or attitude in coaxial alignment with opening 49. Bearing member 43 also is positionable at a wide range of different orientations or attitudes relative to opening 49. With shaft member 17 extending through passageway 45, bearing member 43 contacts beating seat 47 along a circular line of engagement indicated by reference numeral 73 on partial spherical surface 67 and passing through point 71. Also, in this position, the surface of frusto-conical bearing seat 47 is tangent to partial spherical surface 67.

A self centering bearing retainer 75 urges bearing member 43 into alignment with bearing seat 47. Retainer 75 may be formed of, for instance, any generally thin, resilient sheet metal such as spring steel. Retainer 75 has a thin annular body 77 with a plurality of resilient fingers 79 generally equally angularly spaced about body 77 and extending radially outwardly therefrom. An annular flange or lip 81 is formed on body 77 adjacent the radially innermost edge thereof and extends angularly therefrom. A frusto-conical surface 83 is formed by lip 81 for engagement with partial spherical surface 67 of bearing member 43.

When properly aligned and installed, frusto-conical surface 83 of retainer 75 is engaged with partial spherical surface 67 such that annular body 77 of retainer 75 encircles alignable bearing member 43. Retainer 75 is urged into engagement with bearing member 43 by engagement of radially outwardly located fingers 79 of retainer 75 with an annular shoulder or step 85 located on an oil well cover 87 seated or otherwise in engagement with a cylindrical or other shaped surface on end plate 15. When positioned in the above described manner, retainer fingers 79 of bearing retainer 75 are resiliently stressed so as to urge frusto-conical surface 83 into tangential engagement with partial spherical surface 67 of bearing member 43. Fingers 79 create an aligning or centering force identified by the letter "F" from oil well cover 87 through bearing retainer 75 to urge bearing member 43 into alignment with bearing seat 47. Force F also acts on bearing member 43 to effect alignable movement or rotation of bearing member 43 generally about a center of curvature 89 of partial spherical surface 67 located on axis 61.

Aligning force F also urges lip 81 towards aligning or self-centering engagement with partial spherical surface 67 thereby forming another generally circular line of engagement, as indicated by second dashed line 91.

Like the tangential line of engagement 73 between partial spherical bearing surface 67 and frusto-conical bearing seat 47, the engagement between bearing surface 67 and frusto-conical surface 83 is generally tangential along circular line of engagement 91 when bearing member 43 is in its aligned position. In this regard, a radius line (not shown) from the center of curvature 89 of partial spherical surface 67 to circular line of engagement 73 will be generally perpendicular to frusto-conical bearing seat 47. Similarly, a radius line (not shown) drawn between the center of curvature 89 and circular line of engagement 91 on surface 67 will be generally perpendicular to frusto-conical surface 83. Circular lines of engagement 73 and 91 are furthermore generally equally radially spaced from central axis 61.

As mentioned above, lubricating oil forms a hydrodynamic film between journaling portion surface 55 and the outer surface of shaft member 17 thereby enabling a smooth and low friction rotation of shaft member 17 in the journaling portion of bearing member 43. The load carrying engagement, that is, circular line of engagement 73 between partial spherical surface 67 and frusto-conical bearing seat 47, lies on imaginary plane 69 which passes through mid point P of the preselected axial length L of journaling portion 55.

Such a configuration provides that any forces generated during rotation of shaft member 17 within the cylindrical journaling portion 55 will produce equal moments on opposite axial sides of mid-point P to at least assist in forcing or maintaining the aligning attitude of bearing member 43. Further, in the event that forces such as sidewardly directed forces are imposed on shaft member 17 causing minor deflections or bending thereof, the above-described load carrying engagement enables bearing member 43 to follow such deflections or bending of shaft 17 so as to not only maintain the aligning attitude, but also circular lines of engagement 73 and 91 between partial spherical surface 67 and frusto-conical surfaces 47 and 83, respectively. In other words, bearing member 43 is responsive to the aforementioned deflection or bending of shaft member 17 so as to effectively gimbal generally about the center of curvature 89 of surface 67.

A thrust system, identified generally at 93, is provided for maintaining relative axial positioning of bearing member 43 on shaft member 17. Thrust system 93 includes an annular thrust plate member 95, a thrust collar 97, and a cup washer 99, all coaxially arranged about shaft member 17 so as to be jointly rotatable therewith. Thrust plate member 95 may include, for instance a steel washer and a resin material washer, or other suitable well known members. Thrust collar 97 may be constructed from a resilient material and cup washer 99 may be constructed from stamped steel. Cup washer 99 has a tab or key portion 101 (FIG. 6) extending radially inwardly at an angle so as to be receivable in cooperation with a snap ring 103 positioned in a groove 105 (FIG. 6) in shaft member 17.

Thrust collar 97 and/or cup washer 99 may additionally serve an oil slinging function for bearing assembly 11, as discussed hereinafter. An oil slinger 107, which may be a composite disc, is mounted to shaft member 17, adjacent the opposite end of bearing assembly 11, along with an end cap or closure member 109 which is pressed or otherwise secured in position on end plate 15. Further details regarding thrust system 93 are set forth in U.S. Pat. No. 5,277,500, which is assigned to the present assignee.

A generally annular cylindrical wick 111 of lubricant impregnable or lubricant transferring wicking material, such as a wool or a felt, is contained in end cap 109. Oil slinger 107 is disposed in oil slinging relation with respect to wick 111. Additional wicking material 113 is provided in the space defined by oil well cover 87 in position to receive oil slung by thrust collar 97 and/or cup washer 99.

In operation, oil or lubricant flows from wick 111 through passages 115 provided through end plate 15. Oil also flows, by capillary action, from material 113 through the interstices of the sintered metal material of bearing member 43 and into the annular space between the outer surface of shaft member 17 and cylindrical journaling portion 55 to lubricate shaft 17. Lubricating oil can also accumulate between relieved portion 57 and shaft member 17 to provide a reservoir of lubricating oil for supplying the hydrodynamic film between journaling portion 55 and shaft member 17. Once the oil flows into the annular space between bearing 43 and shaft 17, the oil then flows out of the annular space along shaft 17 in either direction. Oil migrates along the shaft to thrust collar 97 or cup washer 99 and is returned to wick 111 and wicking material 113 by the slinging action of thrust collar 97, cup washer 99, and oil slinger 107. Thrust system 93 and oil slinger 107 are illustrated herein by way of example and it is contemplated that other thrust systems and oil slingers having different component parts of various configurations may be utilized in conjunction with shaft member 17 and bearing assembly 11.

Figure 6:
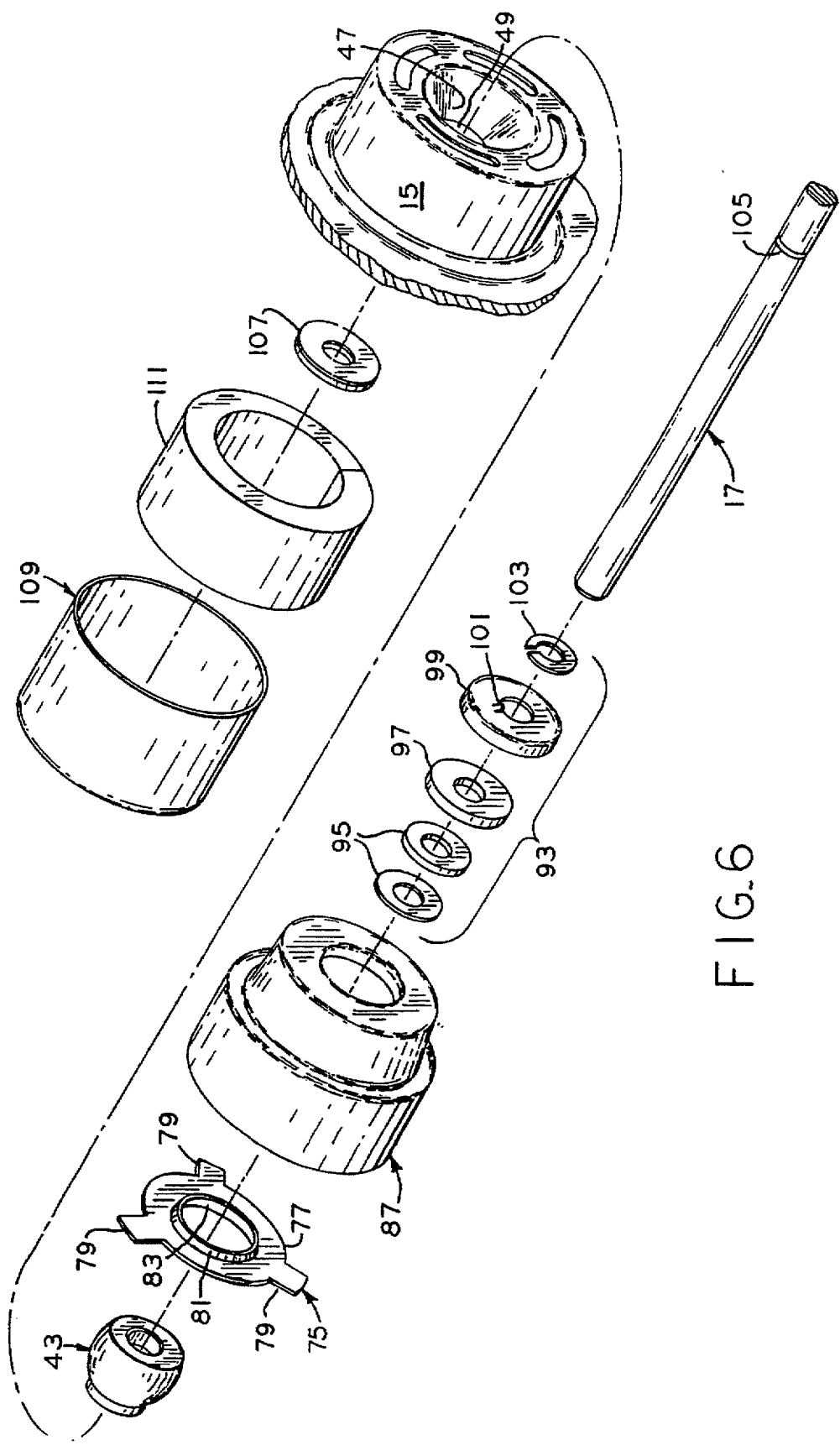
FIG. 6 is an isometric exploded view of the component parts shown in FIG. 5 and illustrating the order of assembly of the bearing assembly and associated dynamoelectric machine components.

FIG. 6 is an isometric exploded view of the above discussed components illustrating an order of assembly. Particularly, shaft member 17 receives snap ring 103 in groove 105. Cup washer 99, thrust collar 97 and thrust plate assembly 95 of thrust system 93 are then slid onto shaft 17 and against ring 103. Shaft 17, ring 103, cup washer 99, thrust collar 97 and thrust plate assembly 95 form a part of the rotor sub-assembly. The other components illustrated in FIG. 6 form the endshield subassembly. Particularly, oil well cover 87 is positionable over shaft member 17 along with bearing retainer 75 and bearing member 43. Shaft member 17 is insertable through central opening 49 of end plate 15 thereby engaging bearing member 43 with frusto-conical bearing surface 47. Oil well cover 87 is then engaged with end plate member 15 of motor housing 19. Oil slinger 107 is placed on the portion of shaft member 17 extending through central opening 49 of end plate 15, and end cap 109 with wick 111 positioned therein is engaged with end cap 15 to complete assembly.

FIG. 7 shows another embodiment of a bearing assembly 151 which includes a bearing 153 having a chamfered portion 155 intermediate a cylindrical journaling portion 157 and a relieved or counterbore portion 159. Chamfer portion 155 is axially larger than chamfer 59 (FIG. 2) and facilitates alignment and insertion of shaft member 161 into cylindrical journaling portion 157 of passage 163 as well as the flow of lubricating oil thereto. Relieved portion 159 accommodates a thrust surface oil feed wick member 165. Wick member 165 is an annular member of a desired lubricant wicking material.

An annular thrust plate 167 is located adjacent wick member 165, and an annular thrust washer/oil slinger member or assembly 169 is adjacent thrust plate 167. Thrust plate 167 and slinger member 169 cooperate to assist in maintaining wick member 165 disposed in counterbore portion 159. Specifically, a leg portion 171 of slinger member 169 and a wall surface of thrust plate 167 are in firm contact with wick member 165 and prevent wick member 165 from sliding out of position relative to counterbore portion 159.

Slinger member 169 includes an outer ring 173 and an inner ring 175. Outer ring 173 prevents dust and water from entering into the motor housing. Inner ring 175 functions as an oil slinger. Oil well cover 177 prevents leakage of oil to other motor components and also prevents dust and water from contaminating the lubricant.

A snap ring 179 is cooperatively engaged in a groove 181 in shaft member 161 for retaining oil slinger member 169 in axial position on shaft member 161. With this configuration of snap ring 179, oil slinger member 169 and thrust plate 167, axial forces are transferred to thrust plate 167 by snap ring 179 through oil slinger member 169. By transferring such axial forces to thrust plate 167 without imparting such forces to bearing 153, bearing 153 is subjected to less friction and heating, which of course is desirable.

In addition, wick member 165 provides a positive flow of lubrication between thrust plate 167 and bearing 153. Such positive lubrication flow facilitates ensuring that lubrication is disposed between cylindrical journaling portion 157 of bearing 153 and shaft member 161. Wick member 165 also facilitates guidance of shaft 161 into cylindrical journal portion 157 during assembly.

An annular shaft seal member 183 adjacent first end surface 185 of bearing 153 retains the lubricating oil and prevents the escape or leakage of such oil along shaft member 161. Seal member 175 may be glued to end shield 187 using an elastomer type glue or seal member 183 may be press-fit into engagement with end shield 187.

A frusto-conical thrust beating seat 189 and bearing retainer 191 maintain bearing 153 in the desired position as described hereinbefore with respect to bearing member 43. Specifically, at the center "P" of the effective bearing length "L" as measured by the distance between first end surface 185 and chamfered portion 155 (indicated as distance "x"), frusto-conical bearing seat 189 of end shield 187 supports bearing 153. Further, bearing retainer 191 is stressed into tangential engagement with bearing 153. Such a configuration enables bearing 153 to effectively gimbal as hereinbefore described. In addition, any forces generated when rotation of shaft member 161 occurs will produce equal moments on opposite axial sides of mid-point P to assist in maintaining an aligned attitude of bearing 153.

Bearing assembly 151 and the cooperation between oil slinger member 169 and thrust plate 167 provide many advantages. For example, the positive lubrication flow provided by wick member 165 assists in maintaining the hydrodynamic oil film between journaling portion 157 and shaft member 161 as shaft member 161 rotates. Further, by reducing the axial forces which may act on bearing 153, bearing 153 is subjected to less friction forces and heating. By reducing the friction forces and heat acting on bearing 153, bearing 153 operates more efficiently, which improves the overall operation of the motor.

FIG. 8 shows still another embodiment of a bearing assembly 201 having generally the same component parts and functioning generally in the same manner as bearing assembly 11 illustrated in FIG. 5. Like component parts of bearing assembly 201 corresponding to those of bearing assembly 11 are designated by the same reference number in FIG. 5. Bearing assembly 201 includes a slot 203 in member 43 as shown. Slot 203 is adapted for receiving a feeder wick member 205 formed of any desired lubricant impregnable or lubricant transferring wicking material, such as described above. Slot 203 intersects end surface 51 to allow wick 205 to have surface to surface contact with shaft member 17 and be in contact with the lubricant reservoir. Feeder wick member 205 is shaped so as to at least generally conform to the configuration of slot 203 and also to the shape between bearing retainer 75 and end plate 15 of bearing member 43.

FIG. 9 is a left side view of bearing member 43. Specifically, as shown in FIG. 9, wick 205 is disposed within slot 203. Also shown in FIG. 9 are end surface 51, cylindrical journaling surface 55 and partial spherical surface 67.

When impregnated with lubricating oil, wick member 205 provides lubrication between the journaling surface 55 of alignable bearing member 43 and shaft member 17. Improved oil flow characteristics are achieved between journaling surface 55 and shaft member 17 due to the presence of wick member 205. Bearing assembly 201 enables the use of non-porous bearing material for bearing member 43. Use of such non-porous material increases the load carrying capacity of bearing member 43 which, in many applications, is highly desirable. Non-porous material also is typically less expensive than porous material, and therefore, use of such non-porous material facilitates reducing the overall cost for bearing member 43.

From the preceding description of several embodiments of the present invention, it is evident that the objects of the invention are attained. Although the invention has been described and illustrated in detail, it is to be clearly understood that the same is intended by way of illustration and example only. For example, although the frusto-conical bearing seat is shown integrally formed with the end plate, various other constructions could likewise be used, such as providing a bearing seat on a separate member attached to the end plate. Additionally, the motor as shown is but one of many dynamoelectric machine embodiments with which an alignable bearing assembly in accordance with the present invention could be used. Accordingly, the spirit and scope of the invention are to be limited only by the terms of the appended claims.

What is claimed is:

1. A bearing assembly for supporting a rotor shaft coupled to a rotor forming part of an electric motor, said assembly comprising a bearing member having a passage extending therethrough, said passage at least in part being formed by a generally cylindrical journaling surface having a center axis and a preselected axial length, said passage further formed by a relieved portion adjacent said cylindrical journaling surface, said relieved portion having a larger diameter than said journaling portion, said bearing member further having an outer portion at least in part forming a generally circumferential surface substantially coaxial with said cylindrical journaling surface, and a bearing seat engageable with said circumferential surface of said bearing member and along a generally circular line of engagement extending therearound, the generally circular line of engagement defining an imaginary plane extending generally perpendicular to the central axis through the mid-point of the preselected axial length of said journaling surface.

2. A bearing assembly in accordance with claim 1 wherein said circumferential surface of said bearing member at least in part comprises a partial spherical surface.

3. A bearing assembly in accordance with claim 2 wherein said partial spherical surface has a center of curvature located on the central axis.

4. A bearing assembly in accordance with claim 1 further including a lubricating oil impregnable member disposed in said relieved portion.

5. A bearing assembly in accordance with claim 1 wherein said relieved portion has an axially tapered shape.

6. A bearing assembly in accordance with claim 1 further including a cavity formed by said bearing member communicating with said cylindrical journaling surface and with said circumferential surface.

7. A bearing assembly in accordance with claim 6 further including a lubricating oil impregnable member disposed in said cavity.

8. A bearing assembly for supporting a rotor shaft of a motor, said assembly comprising:
   a bearing body, a passageway extending through said body, the passageway being at least in part formed by a generally cylindrical journaling surface having a central axis and a preselected axial length, a generally circumferential surface on at least a part of a peripheral portion of said body and extending generally coaxially about the central axis; and
   a bearing seat engageable with said body along a predetermined generally circular engagement line on said circumferential surface of said body and at the intersection with said circumferential surface of an imaginary plane extending generally perpendicularly to the central axis through the mi-dpoint of the preselected axial length of said journaling surface, said bearing seat comprising a frusto-conical surface.

9. A bearing assembly in accordance with claim 8 further comprising a wick receiving slot formed in said body intersecting both the passageway and said generally circumferential surface.

10. A bearing assembly in accordance with claim 8 further comprising a counterbore formed adjacent one end of the passageway and adapted for receiving a lubricant impregnable wick member.

11. A bearing assembly in accordance with claim 8 further comprising a chamfer formed on said body adjacent one end of the passageway.

12. An electric motor comprising:
   at least one end frame;
   a stator spaced from said end frame and including windings;
   a rotor disposed in magnetic coupling relation with said stator and rotatable about a centerline axis;
   a rotor shaft mounted to said rotor so that said shaft is rotatable about the rotor centerline axis; and
   a bearing assembly comprising a bearing body, a passageway extending through said body, the passageway being at least in part formed by a generally cylindrical journaling surface having a central axis and a preselected axial length, a generally circumferential surface on at least a part of a peripheral portion of said body and extending generally coaxially about the central axis, a bearing seat engageable with said body along a predetermined generally circular engagement line on said circumferential surface of said body and at the intersection with said circumferential surface of an imaginary plane extending generally perpendicularly to the central axis through the mid-point of the preselected axial length of said journaling surface, said bearing seat comprising a frusto-conical surface integrally formed with said end frame.

13. An electric motor in accordance with claim 12 further comprising a wick receiving slot formed in said body intersecting both the passageway and said generally circumferential surface.

14. An electric motor in accordance with claim 12 further comprising a counterbore formed adjacent one end of the passageway and adapted for receiving a lubricant impregnable wick member.

15. An electric motor in accordance with claim 12 further comprising a chamfer formed on said body adjacent one end of the passageway.

16. An electric motor, comprising:
   at least one end frame, said end frame having an opening and a bearing seat;
   an oil well cover mounted to said end frame;
   a stator spaced from said end frame and including windings;
   a rotor disposed in magnetic coupling relation with said stator and rotatable about a centerline axis;
   a rotor shaft mounted to said rotor so that said shaft is rotatable about the rotor centerline axis and extends through the opening of said end frame;
   a bearing comprising a bearing body having a passageway extending therethrough, the passageway at least in part having a journaling surface with a preselected axial length and a central axis, said bearing body further having a generally circumferential peripheral surface extending coaxially about the central axis, said bearing circumferential peripheral surface being seated in said bearing seat of said end frame, said bearing seat engageable with said circumferential surface of said bearing body along substantially one generally circular line of engagement extending therearound, the generally circular line of engagement defining an imaginary plane extending generally perpendicular to the central axis through the mid-point of the preselected axial length of said journaling surface;
   a lubricant impregnable wick member, at least a portion of said wick member disposed in said counterbore of said bearing and positioned for supplying lubricant to said rotor shaft;
   a thrust plate mounted to said oil well cover;
   an oil slinger mounted on said rotor shaft and adjacent said thrust plate; and
   a ring mounted to said rotor shaft so that if said rotor shaft moves axially in one direction relative to the rotor centerline axis, axial forces are transferred from said ring through said oil slinger to said thrust plate.

17. An electric motor in accordance with claim 16 wherein said bearing further comprises a chamfered portion adjacent and between said journaling surface and said counterbore.

18. An electric motor in accordance with claim 16 further comprising a bearing retainer in engagement with said bearing circumferential peripheral surface.

19. An electric motor in accordance with claim 16 wherein said bearing seat engages said bearing circumferential peripheral surface a long a generally circular line of engagement defining an imaginary plane extending generally perpendicular to the central axis through the midpoint of the preselected axial length of said journaling surface.

20. An electric motor in accordance with claim 16 further comprising a seal member mounted to said end frame for limiting the movement of lubricant along said rotor shaft.

21. An electric motor in accordance with claim 16 wherein said thrust plate and said oil slinger cooperate to maintain at least a portion of said wick member disposed in said counterbore of said bearing.

22. An electric motor in accordance with claim 16 wherein said oil slinger limits contaminants from passing through the opening in said end frame to said bearing.

23. A bearing assembly for supporting a rotor shaft coupled to a rotor forming part of an electric motor, said assembly comprising a bearing member having a passage extending therethrough, said passage at least in part being formed by a generally cylindrical journaling surface having a center axis and a preselected axial length, said bearing member further having an outer portion at least in part forming a generally circumferential surface substantially coaxial with said cylindrical journaling surface, and a bearing seat having a generally frusto-conical shape and engageable with said circumferential surface of said bearing member and along a generally circular line of engagement extending therearound, the generally circular line of engagement defining an imaginary plane extending generally perpendicular to the central axis through the mid-point of the preselected axial length of said journaling surface.

24. A bearing assembly in accordance with claim 23 wherein said circumferential surface of said bearing member at least in part comprises a partial spherical surface.

25. A bearing assembly in accordance with claim 24 wherein said partial spherical surface has a center of curvature located on the central axis.

26. A bearing assembly in accordance with claim 23 wherein said passage is further formed by a relieved portion adjacent said cylindrical journaling surface, said relieved portion having a larger diameter than said journaling portion.

27. A bearing assembly in accordance with claim 26 including a lubricating oil impregnable member disposed in said relieved portion.

28. A bearing assembly in accordance with claim 26 wherein said relieved portion has an axial tapered shape.

29. A bearing assembly in accordance with claim 23 further comprising a cavity formed by said bearing member communicating with said cylindrical journaling surface and with said circumferential surface.

30. A bearing assembly in accordance with claim 29 further comprising a lubricating oil impregnable member disposed in said cavity.

31. A bearing assembly for supporting a rotor shaft coupled to a rotor forming part of an electric motor, said assembly comprising a bearing member having a passage extending therethrough, said passage at least in part being formed by a generally cylindrical journaling surface having a center axis and a preselected axial length, said bearing member further having an outer portion at least in part forming a generally circumferential surface substantially coaxial with said cylindrical journaling surface, and a bearing seat engageable with said circumferential surface of said bearing body along substantially one generally circular line of engagement extending therearound, the generally circular line of engagement defining an imaginary plane extending generally perpendicular to the central axis through the mid-point of the preselected axial length of said journaling surface.

32. A bearing assembly in accordance with claim 31 wherein said circumferential surface of said bearing member at least in part comprises a partial spherical surface.

33. A bearing assembly in accordance with claim 32 wherein said partial spherical surface has a center of curvature located on the central axis.

34. A bearing assembly in accordance with claim 31 wherein said passage is further formed by a relieved portion adjacent said cylindrical journaling surface, said relieved portion having a larger diameter than said journaling portion.

35. A bearing assembly in accordance with claim 34 including a lubricating oil impregnable member disposed in said relieved portion.

36. A bearing assembly in accordance with claim 34 wherein said relieved portion has an axial tapered shape.

37. A bearing assembly in accordance with claim 31 further comprising a cavity formed by said bearing member communicating with said cylindrical journaling surface and with said circumferential surface.

38. A bearing assembly in accordance with claim 37 further comprising a lubricating oil impregnable member disposed in said cavity.

39. A bearing assembly in accordance with claim 31 wherein said bearing seat has a generally frusto-conical shape.

* * * * *